Aug. 14, 1945. T. F. SAFFADY 2,382,101
ELECTRIC IRON
Original Filed Dec. 6, 1943

Inventor
THOMAS F. SAFFADY
By Daniel Mullen
Attorney

Patented Aug. 14, 1945

2,382,101

UNITED STATES PATENT OFFICE 2,382,101

ELECTRIC IRON

Thomas F. Saffady, Detroit, Mich.

Original application December 6, 1943, Serial No. 513,050. Divided and this application August 17, 1944, Serial No. 549,900

1 Claim   (Cl. 240—2)

This application relates to electric irons and more particularly to means for illuminating the surface upon which the iron is moving and the area around the iron. This application is a division of my prior application, Serial No. 513,050, filed December 6, 1943.

For an understanding of the electric iron herein disclosed, reference should be had to the appended drawing.

Figure 1:
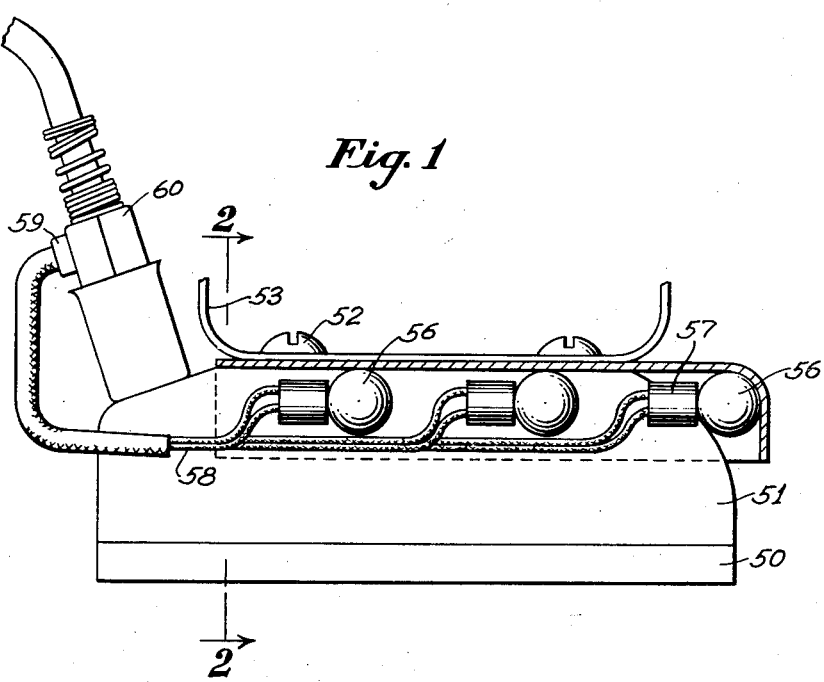
Fig. 1 shows an embodiment, adapted to be attached to a conventional electric iron as a lighting accessory.
Figure 2:
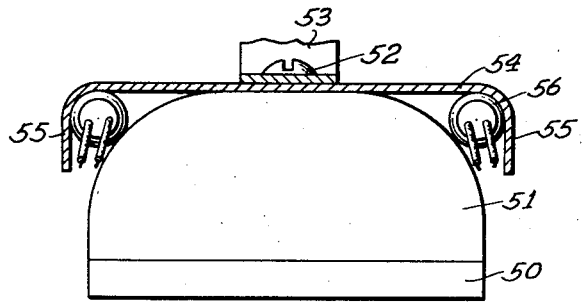
Fig. 2 is a section on line 2—2 of Fig. 1.

Figs. 1 and 2 show a construction adapted to be attached to a conventional iron as a lighting accessory. The conventional iron is represented as having a sole 50 and a cover 51 fastened thereto by the screws 52 which secure the handle bracket 53 and the cover and heating plate, not shown, in assembly.

Disposed between the cover 51 and the bracket 53 is a plate 54 having downwardly turned sides 55, such plate being mounted by the screws 52.

Disposed within the space between the cover 51 and the sides 55 of the plate 54 are lamp bulbs 56, sockets 57, and wiring 58. The wiring terminates in a cord cap 59 beyond the plate 54 which plugs into a utensil plug connector 60 of a type which has in its side a receptacle for a conventional cord cap. The plate 54 holds the bulbs in place against the cover 51 and this holds the assembly of the bulbs, the sockets, and the wiring in proper place, without the necessity of independently fastening the wiring or the sockets to the plate 54. However, it is obvious that means may be employed for fastening the wiring and the sockets independently to the plate 54, and not relying upon the cooperation of the plate 54 and the cover 51 for holding the wiring and the sockets in place. The bulbs will be connected in series across the line which energizes the heating plate of the iron.

Now having described the electric iron herein disclosed, reference should be had to the claim which follows.

An electric iron having a cover, and a top plate secured thereto, the cover being of less projected area at the top than at the bottom, and the plate having depending flanges, whose edges are spaced transversely from the cover, and electric lights within the space between the plate flanges and the cover for illuminating the area around the iron through the space between the flange edges and the cover.

THOMAS F. SAFFADY.